though the air chamber is provided with apertures 11 that admit air to the air chamber 2.

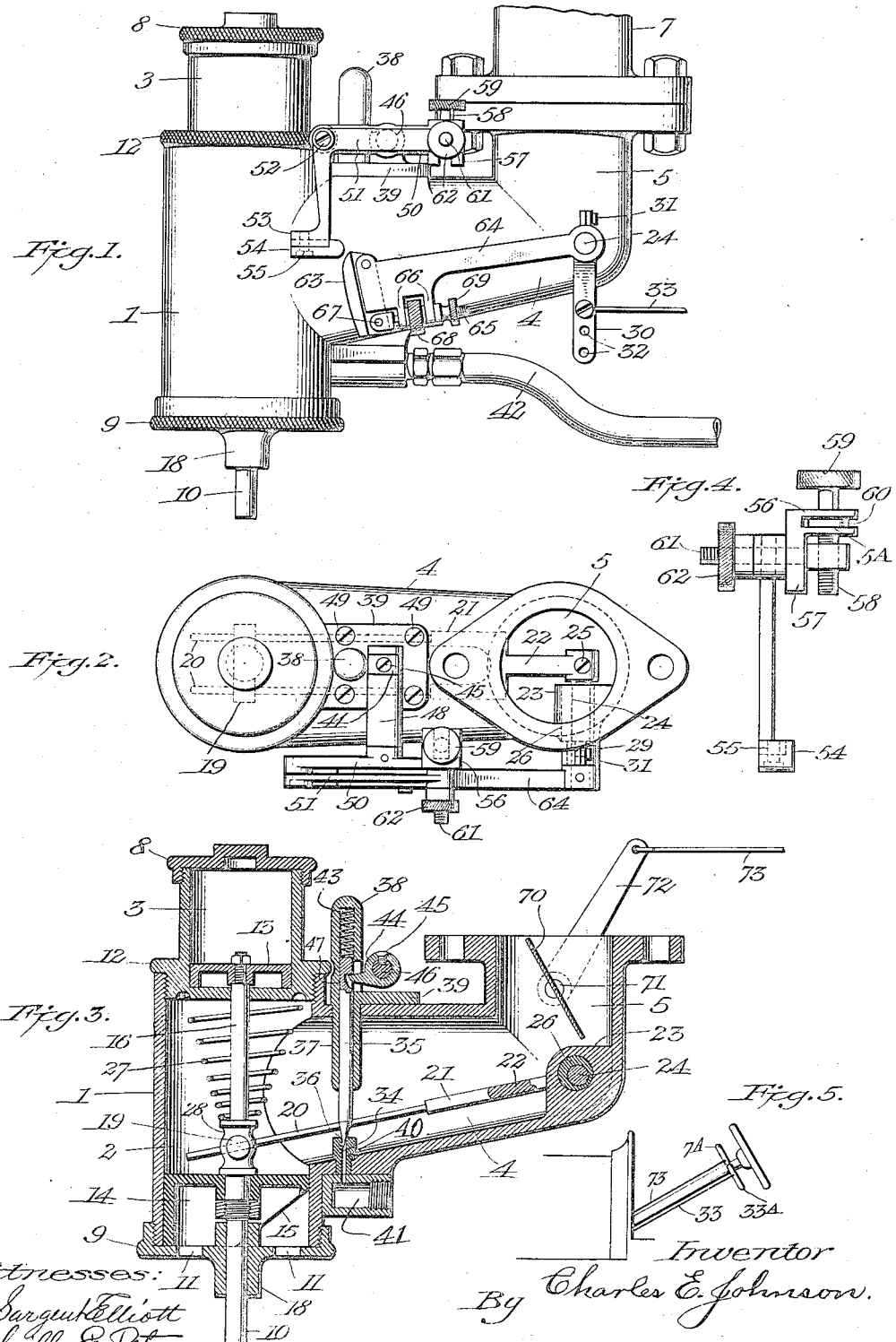

UNITED STATES PATENT OFFICE.

CHARLES E. JOHNSON, OF DENVER, COLORADO.

AUTOMATICALLY-OPERATING CARBURETER.

1,212,491.　　　　Specification of Letters Patent.　　Patented Jan. 16, 1917.

Application filed December 27, 1915. Serial No. 68,914.

*To all whom it may concern:*

Be it known that I, CHARLES E. JOHNSON, a citizen of the United States of America, residing at the city and county of Denver and State of Colorado, have invented a new and useful Automatically-Operating Carbureter for Automobile and other Internal-Combustion Engines, of which the following is a specification.

My invention relates to an automatically operating carbureter for automobile, marine and stationary gasolene and other explosive mixture engines; and the objects of my invention are: First, to provide a new type of carbureter that is automatically controlled to regulate the supply of explosive mixture by the variable running speeds of the engine. Second, to provide a carbureter into which air can not flow except when the engine is running. Third, to provide a carbureter having an independent adjustable low speed regulator and an independent adjustable high speed regulator. Fourth, to provide a manually operating dash adjustment that works independent of either the low or high speed adjustment, and that will increase or diminish the volume of gasolene flowing to the carbureter. And fifth, to provide a positively operating carbureter that is simple in construction and reliable in action, that is free from springs and also from a float valve, and one in which air cannot enter except when the engine is running fast enough to produce a suction force strong enough to open the air intake valve.

I attain these objects by the mechanism illustrated in the accompanying drawings, in which:

Figure 1, is a side view of the improved carbureter. Fig. 2, is a plan view of the same. Fig. 3, is a vertical longitudinal sectional view thereof. Fig. 4, is an end view of the adjustable lever mechanism which operates the gasolene-admitting needle valve. And Fig. 5, is a side view on a reduced scale, showing the hand operated levers and connections for the throttle valve and the cam carrying push bar.

Similar letters of reference refer to similar parts throughout the several views.

Referring to the drawings, I illustrate in Fig. 1, a side elevation of a carbureter embodying my invention. My new carbureter consists of a casing 1, in which there is an air intake cylinder 2, and a dash pot cylinder 3, both of which are cylindrically bored cylinders. A carbureting chamber 4, is positioned at one side of the air intake cylinder. An open passageway is formed between the air intake cylinder and the carbureting chamber, and a throttle valve chamber 5 is formed. Each of these members of the casing contains working parts that coöperate with the working parts of the others. The throttle valve chamber is of circular pipe form and its top edge is provided with a flange 6 which is arranged to be bolted directly to the intake flanged aperture of the engine's manifold pipe 7. The cylindrical chambers 2 and 3 are formed in two different diameters. The larger cylinder 2 is a bored atmospheric air intake cylinder and chamber. The smaller cylinder 3 is a bored cylinder and forms a dash pot or cushioning cylindrical chamber. The dash pot cylinder 3 is placed on top of the air inlet chamber 2, and both chambers preferably stand in a vertical plane in relation to the vertical cylinders of the engine. The upper end of the dash pot cylinder and the lower end of the air intake cylinder are provided with removable caps 8 and 9 respectively, which are removably threaded to them, the edge flange of each being knurled. The air intake cylinder's lower cap 9 is provided with a central hub that contains an axial aperture which forms a sliding bearing for a piston rod 10 and the cap 9 is provided around this hub with apertures 11 that admit air to the air chamber 2. The casing of the dash pot cylinder 3 is preferably removably threaded to the upper end of the air intake cylinder. The base flange 12 of the smaller cylinder forms the upper cap of the larger cylinder. The dash pot cylinder is provided with a reciprocating piston head 13 which fits loosely enough therein to allow a little air to flow past it to the top of its bore. The air intake chamber is provided with an air inlet piston head 14 which is reciprocally mounted in it. This piston head is provided with an inwardly sloping side 15 that admits air quickly as its upper edge moves past the lower edge of the carbureting chamber.

A piston rod 16 is shouldered at its opposite ends and is bolted to the smaller piston head 13, and is threaded to the air intake piston head, and it extends beyond this piston head slidably through the hub 18 of the cap 9, which acts as a guideway for it. The piston rod is provided with an enlarged lug portion adjacent to the top of its air intake head, transversely through which a pin 19 is loosely mounted. This pin projects beyond the lug on both sides, and through its opposite ends the ends of two rods 20 extend slidably. This pin turns slightly when the piston rod 16 is raised. The opposite ends of these rods are connected to the ends 21 of the forked end of a connecting rod 22, which extends through the adjacent carbureting chamber to a lug portion 23 within the chamber, where it is secured to one end of a pin 24, by a screw 25. This pin is mounted in an eccentric sleeve 26 and the sleeve is mounted in the lug portion 23, as will be presently explained. This piston rod 16 is provided with an inverted cone shaped expansive tension coiled spring 27 between the lug 28 and the bottom of the lower threaded end of the dash pot cylinder, where it screws onto the top edge of the lower cylinder, where a circular groove is formed to receive it and hold its upper end concentric to the rod, and this spring 27 normally holds the two piston heads at the end of the lower stroke of their reciprocal movement. The eccentric sleeve 26 is rotatably mounted on the pin 24 and this eccentric sleeve is rotatably mounted in an aperture formed in the lug 23 that is inside of the casing. The eccentric projects through the adjacent side of the casing of the carbureting chamber far enough to receive on its outer end the split clamping hub end 29 of a lever 30, which fits on it and is clamped to it by a clamping screw 31. This lever 30 depends downwardly from the eccentric sleeve, and its lower end is provided with three apertures 32, to either one of which one end of a pull and push rod 33 is secured, the opposite end of which extends through the dash preferably to the steering post of the automobile just below the hand wheel and within reach of the driver. Its end is provided with a hand grasping lever portion 33<sup>A</sup>. When the driver pushes the rod to move the lever 30 toward the air intake cylinder, the eccentric sleeve 26 is turned, and the rod 24, which passes through the said sleeve, is moved to push forward a bar carried thereby, which engages a lever that operates a gasolene-controlling needle valve, thereby to admit a larger quantity of gasolene to produce a richer mixture than is required under ordinary conditions, as will be fully explained hereinafter.

The carbureting chamber 4 is provided with a large air passageway between the air intake chamber and its adjacent end. This carbureting chamber is preferably in the shape of a tapering tubular member, that is larger at its end that blends into the opposite side portions of the air intake cylinder, and then tapers from this larger end smaller to its outlet chamber 5. The carbureting chamber is provided with a gasolene inlet aperture 34, and with a gasolene needle valve 35 and valve seat 36, that is arranged to control the feeding and flowing movement of the gasolene into this chamber. The gasolene needle is seated in a long sleeve-like bearing 37, that extends through the casing and part way across the carbureting chamber. The upper end of the needle is supported in a hood 38 that forms a part of a bracket 39, of which the sleeve 37 is also an integral part, and which is removably secured to the top of the casing. The lower end of the needle is pointed and is seated in the V-shaped tapered valve seat 36, that is formed at the upper end of the small gasolene inlet-passageway 34 that is formed in a nipple 40 at the bottom of the carbureting chamber, and which connects with a gasolene supply inlet aperture 41 that is formed on the under side of the casing of the carbureting chamber in position to be connected to a pipe 42 which leads to a supply of gasolene. The upper end of the hood is provided with an expansive spring 43, which rests on top of the needle valve 35 and exerts a constant downward resilient tension against the top end of the needle that normally holds its valve point seated tight enough against its seat to prevent any leakage of gasolene past it, into the carbureting chamber. The valve stem is lifted to open the gasolene inlet valve by means of a finger lever 44, one end of which is mounted on and is secured by a screw to one end of a pin 46. The opposite end of the finger lever has a finger end that projects through an aperture in the side of the hood and projects into a recess 47 formed in the adjacent side of the needle valve, and bears against a square shouldered portion in the top of this recess. This pin 46 to which the valve stem raising finger lever is secured, is journaled in a lug bearing 48 formed on the bracket 39 that is secured to the top of the casing by screws 49. The pin 46 extends beyond the bearing lug far enough to receive on its end a rock arm 50 which is rigidly pinned to it. One end of this rock arm 50 is pivotally connected to one end of the horizontal end of a right angled connecting rod 51 by a screw 52. The end of the right angled portion of the connecting rod terminates in a lug 53, to which a cam block 54 is rigidly secured by a screw 55, the cam shoe being preferably provided with a shouldered recess which receives the lug 53. The opposite end of this rock arm 51 is provided with a double forked end which consists of two right angled forked members 56 and 57; the fork member 56 stands in substantially a horizontally plane, and the fork portion 57 stands in a substantially vertical plane, but both are movable in slightly straight alinement to this plane by adjustment, as will be presently described. Both of these forked portions have flat outer and inner sides. The horizontal fork has a recess 5ᴬ centrally through its thickness, and a threaded stem 58 which is provided with a knurled head 59, and with a collar portion 60, fits rotatably between the ends of the horizontal fork, while its collar 60 fits rotatably in the recess 5ᴬ, while the threaded end extends below the fork and is threaded into an eye bolt 61. The threaded end of this eye bolt extends through the vertical fork 57, passing between its ends and beyond them, and one end of the connecting rod 51 is loosely mounted on the threaded end of the bolt, and a finger manipulating knurled nut 62 is threaded to the outer end of the eye bolt and bears against the side of the opposite end of the connecting rod 51 from its right angled end. By loosening the nut the eye bolt and the end of the connecting rod that is mounted on it can be raised or lowered, which adjustment will effect the throw of the cam block 53 at the end of the right angled arm 51. This is a very essential adjustment of my carbureter, as it effects the action of the needle valve and is the mechanism I employ to effect and maintain any desired predetermined range of low speeds, and I term this mechanism the low speed adjustment.

The cam block 54 engages the face of a cam shoe 63 that is mounted on the end of a reach bar 64, one end of which is secured on the end of the pin 24. The opposite end of the reach rod is provided with a slot in which the cam shoe fits loosely, and is pivoted at its upper end by a pin so that its lower end can be swung outwardly away from or inwardly toward the adjacent end of the reach bar, and in order to move the lower end of the cam shoe in or out I secure to it a threaded stem 65 that is housed in lugs 66 that are formed in the lower side of the reach bar, and which is arranged as follows:

One end of the stem is forked and straddles the rear edge of the lower end of the cam shoe, and is pivotally pinned to it by a pin 67. The opposite end of the stem then extends loosely through and beyond the lugs between which there is a space large enough to receive loosely a knurled disk form of nut 68, which is threaded on the stem between the lugs. The outer end of the threaded rod is provided with a thumb check nut 69. By loosening the disk nut 68 the stem 69 and turning the disk nut 68 the stem moves the lower end of the shoe 63 outwardly and inwardly. If the cam is moved outwardly it causes the block 54 of the end of the right angled end of the connecting rod 51 to move back and upwardly, which through the medium of the rock arm that is pivotally connected to this connecting rod raises the needle valve and admits more gasolene to the mixing chamber. This reach rod is rigidly secured to the outer end of the pin 24, and the air intake piston rods 10 and 16 are connected with the pin through the medium of the rods 20, and arm 22, and the air suction of the reciprocal strokes of the several pistons of the engine lifts the air intake piston 14 against its spring 27 and admits air to the carbureting chamber, and the upward stroke of the air intake piston is of a length to carry the face of the shoe 63 in engagement with the block 54 and across its length to its lower end portion, and the block is moved back far enough to raise the needle enough to admit sufficient gasolene to give as rich a mixture as is desired to start the engine, and then as the engine increases its speed it will further raise the needle and thus open the gasolene valve as the upward movement of the air piston admits a constantly increasing volume of air as the speed of the engine increases. This reach bar 64 with the inner rods and their supporting pin together with the adjustable throw cam shoe I term the high speed adjustment of my carbureter. As illustrated in Fig. 1, the cam shoe is set with its face concentric to the axial center of its supporting pin, and when raised in engagement with and across the face of the cam block 54 the engine would run only in low speed throughout the entire sweep of the cam face of the cam shoe across the face of the cam block 54.

Consequently a driver in order to secure a range of speeds varying from his adjusted and set low speed to the limit of the high speed he desires for general conditions, has to adjust the high speed mechanism by manipulating the threaded stem 65 to throw the lower end of the cam shoe outwardly so that it will move the cam block successively back farther and farther to the lower end of the face of the cam shoe, as the face of the cam shoe sweeps upwardly across it, thus causing the cam to raise the needle higher and higher and let in a constantly increasing flow of gasolene as the speed of the engine increases. Then in case he desires more speed and power or more air and gasolene, than his general conditions adjustment give him, he moves his dash adjustment lever to move the lever 30 and consequently the eccentric sleeve 26 to which this lever 30 is secured, which moves the reach rod and the face of its cam shoe still farther forward toward the cam pin, which is moved farther back and upwardly throughout the entire sweep of the cam shoe across the end of the cam pin, thus increasing the supply of air and gasolene in as rich an explosive mixture as he desires to meet exceptional conditions. The air and the gasolene mix into an explosive mixture in the carbureting chamber and this explosive mixture flows into the outlet chamber 5, and a valve 70 which is preferably of the flat disk tilting type is mounted on a center pin 71 which extends diametrically across it and through the sides of the surrounding casing and beyond it at one end far enough to receive one end of a lever 72, which is secured to it, the opposite end of which is attached to one end of a wire 73 that extends to the steering post of the automobile, where it is operatively attached and provided with a lever 7A which is so arranged that a short swinging movement of it by the driver will open or close the valve, which I term the throttle valve, as by means of it the volume of the explosive mixture flowing from the carbureter into the engine's cylinders can be regulated.

The operation is as follows: Assuming that the operator has adjusted the low speed adjustment and also the high speed adjustment, the operator starts his engine either with a self-starting mechanism or by cranking it by hand, and opens the throttle valve 70. The starting movements of the different pistons in the cylinders of the engine create a vacuum in the air intake chamber, which draws the air intake piston head quickly upward and permits the air to flow into the carbureting chamber. This suction actuated upward movement of the air intake piston head causes the cam shoe to move up and across the cam block, which lifts and opens the gasolene valve, admitting the adjusted low speed supply of explosive mixture to the engine, which starts the same, and as the engine increases its speed it raises the air intake piston head higher and admits more air and its reach rod and cam shoe admit more gasolene until the engine develops its full adjusted speed for general purposes. When however the operator desires a richer explosive mixture for emergencies and difficult conditions of road travel than his general conditions give him, he operates the dash or steering post emergency valve opening mechanism, which throws the whole cam shoe forward toward the cam pin, which will open the air intake piston and the gasolene valve to their fullest intaking capacity, and he can regulate the volume of the explosive mixture flowing into the manifold pipe and cylinders by the throttle valve. As the air intake piston head moves up and down in its cylinder chamber, the piston head 13 which fits loosely enough in the dash pot cylinder to admit a little air past it, compresses and cushions on this air as it moves up against it and this cushioning action prevents the air intake piston head from chattering or vibrating, and consequently makes its reciprocating action noiseless.

My invention provides an automatically operating suction controlled air intaking carbureter, which is controlled entirely in its air intake action by the reciprocal movements of the pistons of its cylinders, as it is impossible for air to enter it except when the engine is running. I have also provided a very simple, inexpensive, thoroughly practical carbureter that is entirely free in its construction from springs or a floating member, and one in which all the functions move and act with positive precision.

While I have illustrated and described the preferred construction of my carbureter, I do not wish to be limited to the construction and arrangement shown, as many changes might be made without departing from the spirit of my invention.

Having described my invention what I claim as new and desire to secure by Letters Patent, is:

1. In a carbureter, the combination with a casing, having an air intake and a fuel inlet of an automatically controlled air intake valve, a fuel valve, means for raising said fuel valve, a pivot pin, an arm rigidly connected at one end to said pin and having a connection at its other end with the intake valve, a lever secured upon the opposite end of said pin, and an adjustable shoe on said lever for engaging said fuel valve raising means, when the said pin is turned by the raising of the intake valve.

2. In a carbureter, the combination with a casing having an air intake and a fuel inlet, an automatically controlled intake valve and a fuel valve, of means for lifting said fuel valve, an operating rock lever connected to said valve lifting means, a pivot pin, a rock arm secured to said pin at one end and connected at its other end with the said air intake valve, whereby the pin is rocked by the movement of said rock arm, a bar secured at one end to the opposite end of said pin, and an adjustable shoe on the opposite end of said bar for engaging said fuel valve operating rock lever.

3. In a carbureter, the combination with a casing having an air intake, a fuel inlet, an air intake valve and a fuel inlet valve, of rocking means for lifting said fuel valve, means operated by the intake valve for operating said fuel valve lifting means, and adjustable means connected with the said valve lifting means and engaged by intake valve operated means for varying the lifting movement of said fuel valve.

4. In a carbureter, the combination with a casing having an air intake, a fuel inlet, an automatically controlled air intake valve and a fuel inlet valve, of rocking means for operating said fuel valve, means operated by the air intake valve for operating said rocking means, adjustable means connected with the rocking means for varying the rocking movement imparted to the same by the air intake valve operated means, and adjustable means carried by the air intake valve operated means, for increasing the throw of the said fuel valve rocking means proportionately to the rise of the air intake valve.

5. In a carbureter, the combination with a casing having an air intake, a fuel inlet, an air intake valve and a fuel inlet valve, of a rock arm having a finger for lifting said fuel valve, a bell crank form of lever pivotally connected to one end of the said rock arm, while the extremity of its horizontal portion is adjustably connected to the other end of said rock arm, and means operated by the air intake valve for engaging the depending end of said bell crank lever to rock the same together with the fuel valve operating rock arm.

6. In a carbureter, the combination with a casing having an air intake, a fuel inlet, and air intake valve and a fuel inlet valve, of a pivotally mounted pin having a finger for lifting said fuel inlet valve, an arm secured intermediately of its length to said pin, a bell crank lever hinged to one end of said arm, the extremity of its horizontal portion being adjustably connected to the other end of said arm, a rock arm having a cam shoe at one end for engaging the depending end of said bell crank lever, and means operated by the air intake valve for operating said rock arm.

7. In a carbureter, the combination with a casing having an air intake, a fuel inlet, an air intake valve and a fuel inlet valve, of a pivotally mounted pin having a finger for lifting said fuel inlet valve with respect to its inlet, an arm secured intermediately of its length to said pin, a bell crank lever pivotally connected to one end of said arm, the extremity of its horizontal member being adjustably secured to the other end of said arm, whereby the position of said bell crank lever may be varied, a rock arm having an adjustable cam shoe at one end for engaging the depending end of said bell crank lever, rocking means operated by the air intake valve for operating said rock arm, whereby its cam shoe is caused to rock said bell crank lever, and manually operated means for moving said rock arm forward, whereby its cam shoe is extended farther into the path of the depending end of the bell crank lever, and the path of movement of the latter is thereby increased.

8. In a carbureter, the combination with a casing having an air intake, an air intake valve, a fuel inlet and a fuel inlet valve, of a pivotally mounted pin, having a finger for lifting said fuel valve with respect to its inlet, an arm secured intermediately of its ends to said pin, a bell crank lever pivotally connected to one end of said arm, the extremity of its horizontal member being adjustably connected to the other end of said arm, a sleeve mounted in said casing, a pin extending loosely through said sleeve eccentrically to its axis, a lever secured at one end to one end of said pin, and connected at its other end with said intake valve, whereby the pin is turned when the lever is rocked by the movement of the intake valve, an arm connected at one end to the other end of said pin, the free end of said arm having an adjustable cam shoe for engaging the depending end of said bell crank lever, and manually operated means for turning said sleeve to shift the position of the eccentric pin, whereby the said arm is moved forward and the cam shoe thereon is extended farther into the path of the depending end of the bell crank lever thereby to increase the path of movement of the said bell crank lever.

9. In a carbureter, the combination with a casing having an air intake, and air intake valve, a fuel inlet and a fuel inlet valve, of a pivotally mounted pin having a finger for raising said fuel valve with respect to its inlet, a spring for normally holding said valve to close said inlet, an arm secured midway of its length to said pin, a bell crank lever pivotally connected to one end of said arm, the extremity of its horizontal portion being adjustably secured to the other end of said arm, a pivoted arm, a cam shoe hinged at its upper end to the free end of said arm, adjusting means carried by said arm and connected with the lower end of said cam shoe, whereby the said shoe may be adjusted to vary the arc of its movement, said shoe being adapted to engage the depending end of the bell crank lever, means operated by the said air intake valve for rocking said cam shoe supporting arm, thereby to rock the bell crank lever, and manually operated means for moving the said arm forward whereby the cam shoe is extended farther into the path of the depending end of the bell crank lever, and the path of movement of said depending end thereby increased.

10. In a carbureter, the combination with a casing having an air intake and valve, a fuel inlet communicating with said air intake and valve for said fuel inlet, of a pivotally mounted pin having a finger for raising said fuel valve with respect to its inlet, an arm secured midway of its length to said pin, a bell crank lever pivotally connected at one end to said arm, the extremity of the horizontal member of said bell crank lever being adjustably secured to the other end of said arm, means for engaging the depending end of the bell crank lever to rock the same, comprising an arm hinged at one end, a cam shoe hinged at its upper end to the free end of said arm having a curved face normally concentric with the axis of said arm whereby when said shoe engages the depending end of said bell crank lever the same is given an unvarying throw throughout the arc of travel of said shoe, adjusting means connected with the arm for tilting the said shoe on its pivot, so that its face is eccentric to the axis of the arm, whereby the throw of the bell crank lever is continuously increased as the shoe passes through its arc of travel, means operated by the air intake valve for rocking said arm, and manually operated means for moving said arm to project said shoe farther into the path of the depending end of the bell crank lever.

11. In a carbureter, the combination with a casing having an air intake, a valve therefor, having a stem provided with a cross arm, a fuel inlet and a controlling valve therefor, of rocking means for raising said fuel valve, including a bell crank lever, an arm secured at one end to a pivot pin and having an adjustable cam shoe on its free end for engaging the depending end of said bell crank lever to rock the same, and means for rocking said shoe carrying arm, comprising a forked lever, one end of which is rigidly attached to said pivot pin, while the members of the forked end thereof are slidably mounted in the said cross arm, whereby the said forked arm is rocked by the movements of the intake valve.

12. In a carbureter having a variable mixture governing and throttling mechanism, a reciprocating air inlet valve, rods connected to said valve, a pivotal pin to which said rods are connected, an adjustable throw cam and reach rod, said reach rod being connected to said pivotal pin, an eccentric sleeve mounted on said pin, a lever clamped to said sleeve, a gasolene valve, and means including a rock arm and finger lever operated by the cam on said reach rod for raising said needle.

13. In a carbureter, a casing having an air inlet, a carbureting chamber, a valve in said air inlet, rods connected at one end to said inlet valve, a pivotal pin to which the other ends of said rods are connected, an adjustable cam shoe and its supporting rod connected to said pivotal pin, an eccentric sleeve mounted on said pin, a lever clamped to said sleeve, a gasolene admitting needle valve, means including a rock arm and finger lever operated by said reach rod cam for raising said needle, said rock arm having a free end provided with a threaded adjustment connection, a lever connected to said adjustment mechanism at one end and pivotally connected intermediate of its ends to the other end of said rock arm, the other end of said lever being adapted to be engaged by said cam shoe when its supporting rod is rocked through its connection with the intake valve.

In testimony whereof I affix my signature in presence of two witnesses.

CHARLES E. JOHNSON.

Witnesses:
G. SARGENT ELLIOTT,
ADELLA M. FOWLE.